United States Patent

Miyazaki et al.

[11] Patent Number: 5,387,992
[45] Date of Patent: Feb. 7, 1995

[54] OPTICAL FREQUENCY MULTIPLEX CARRIER CONTROL SYSTEM

[75] Inventors: Tetsuya Miyazaki, Nara; Shiro Ryu, Tokyo, both of Japan

[73] Assignee: Kokusai Denshin Denwa Kabushiki Kaisha, Tokyo, Japan

[21] Appl. No.: 136,389

[22] Filed: Oct. 13, 1993

[30] Foreign Application Priority Data

Oct. 15, 1992 [JP] Japan .................................. 4-301620

[51] Int. Cl.6 ............................................ H04J 14/02
[52] U.S. Cl. ..................... 359/124; 359/187;
250/227.26; 356/308; 324/76.19
[58] Field of Search ............... 359/110, 115, 124, 133,
359/143, 158, 166, 177, 187; 250/227.26;
356/308, 349; 324/76.19; 364/4.85; 377/52-53

[56] References Cited

U.S. PATENT DOCUMENTS 4,222,630  9/1980  Delienieres .................... 250/227.26
4,918,700  4/1990  Gambini ............................ 372/32

OTHER PUBLICATIONS

Eng et al., "Star-Counter-Based optical Cross-Connect Switch experiments with turnable receivers", IEEE Journal on Selected Areas in Communications, vol. 8, No. 6, Aug. 1990, pp. 1026-1031.

Primary Examiner—Richard E. Chilcot, Jr.
Assistant Examiner—Kinfe-Michael Negash
Attorney, Agent, or Firm—Emmanuel J. Lobato

[57] ABSTRACT

An optical frequency multiplex carrier control system which permits high-accuracy, high-speed stabilization control of the frequency of an optical signal. Based on the fact that the time waveform of the output signal from scanning type Fabry-Pérot which receives the output optical signal from an optical frequency multiplexer is composed of pulse signals corresponding to an optical frequency standard and spectrum multiplex carriers of the output optical signal, the time intervals between the pulse corresponding to the optical frequency standard and pulses corresponding to the spectra of a scanning signal and each multiplexed carrier are measured by a counter having a high-accuracy clock, and variations in the optical frequency scanning region of the scanning type Fabry-Pérot and in each carrier frequency with respect to the optical frequency standard are detected by hardware, with high accuracy, as variations in the pulse intervals, thereby stabilizing the frequencies of the multiplexed optical carriers.

1 Claim, 4 Drawing Sheets

OPTICAL FREQUENCY MULTIPLEX CARRIER CONTROL SYSTEM

BACKGROUND OF THE INVENTION

The present invention relates to multiplex carrier frequency scanning control in optical frequency division multiplex communications.

In an optical communication network which transmits and receives optical frequency (waveform) multiplexed carriers it is necessary, for selecting each carrier to receive correct information, that stabilization control be effected at the transmitting side to keep predetermined spacing or intervals of multiplexed carrier frequencies (waveforms) to suppress interference between the carriers.

There has been proposed an optical frequency multiplexed carrier control system which employs an optical frequency standard light source having an optical frequency controlled for stabilization by molecular or atomic absorption lines so as to detect frequency variations of multiplexed carriers. (ELECTRONICS LETTERS, 5th January 1989, Vol. 25, No. 1, pp.9–11).

FIG. 4 shows the construction of a conventional optical frequency multiplexed carrier control system. Optical signals from transmitters are multiplexed (N multiplex channels) optical frequency multiplexer 1 together with an optical frequency standard and the multiplexed optical signals are introduced to an optical frequency spectrum detector, wherein it is incident to a scanning type Fabry-Pérot means 4a and transmitted lightwave 4d therefrom is received by a photodetector 4b to detect the optical frequency spectrum of optical frequency standard and each carrier.

In this instance, since the optical frequency scanning region of the scanning type Fabry-Pérot means 4a varies with an ambient temperature change, it is necessary to control each multiplexed carrier frequency while at the same time controlling the optical frequency scanning region relative to the optical frequency standard so that the optical frequency scanning region always maintains a preset optical frequency region of the multiplexed carrier spectra. To this end, optical frequency spectral waveforms of the optical frequency standard and the respective carriers are sampled by an optical frequency spectral waveform sampler formed by an A/D converter which operates in synchronization with a scanning signal and the sampled outputs are provided to spectrum sampling control, optical frequency spectrum interval detector and control information generator 6 formed by a computer for control use, wherein variations in the scanning optical frequency spectrum region and the respective carrier spectra with respect to the optical frequency standard are detected on software. By effecting negative feedback control of a scanning signal generator 4c and light source (1 through N) for multiplexed carriers through control signal generator 7 so that the above-mentioned variations may remain constant, the optical frequency multiplexed carriers can be controlled.

In the sampling of the optical frequency spectral waveforms of the optical frequency standard and the respective carriers through A/D conversion, the accuracy of the detection of the frequency spacing between the optical frequency standard and the respective carrier spectra is limited by the resolution of the A/D converter used, this reduces the accuracy of stabilization control of the carrier frequency with respect to the optical frequency standard. With enhanced resolution of the A/D converter, the frequency spacings detecting accuracy could be improved, but since the number N of pieces of data to be transferred is usually greater than 1000, the time for data transfer to the control computer would become so long that the control delay time would also be increased, making the entire system uncontrollable.

SUMMARY OF THE INVENTION

An object of the present invention is to provide an optical frequency multiplexed carrier control system which permits control for stabilizing the frequency of an output optical signal with high accuracy and at high speed.

To attain the above-mentioned objective, the optical frequency multiplexed carrier control system according to the present invention comprises:

multiplexing means for multiplexing optical carriers together with an optical frequency reference;

scanning type Fabry-Pérot means for analyzing the spectrum of the optical signal from the multiplexing means;

a signal generator for generating a scanning electrical signal for driving the scanning type Fabry-Pérot means;

a photodetector for performing the photoelectric conversion of lightwave transmitted through the canning type Fabry-Pérot means;

a counter which has a function of measuring, in synchronism with the scanning electrical signal, the time interval between a pulse corresponding to the optical frequency standard and the scanning electric signal in the converted electric signal and the time interval between a pulse corresponding to the optical frequency standard and a pulse corresponding to the spectrum of each carrier in the converted electric signal;

a control computer for transmitting control information obtained by computing, from the measured results by the counter, variations in the optical frequency scanning range of the scanning type Fabry-Pérot means and in each carrier frequency with respect to the optical frequency stanard; and control signal generating means responsive to the control information from the control computer to generate and send a control signal to the multiplexing means to effect control for stabilizing the frequency of the optical signal.

The time waveform of the output signal from the scanning type Fabry-Pérot means is a pulse signal corresponding to the spectrum of the optical frequency standard and the multiplexed carriers and the variations in the optical frequency scanning region of the Fabry-Pérot means with respect to the optical frequency standard and in each carrier frequency correspond to variations in the pulse arriving time intervals. By measuring the variations in the pulse arriving time intervals through use of a counter having a high accuracy clock, the variations in the optical frequency scanning region of the scanning type Fabry-Pérot means and in each carrier frequency with respect to the optical frequency standard can be detected with a high degree of accuracy. Moreover, the number of pieces of data of the pulse arriving time intervals corresponding to the optical frequency scanning region and each carrier frequency, which are transferred from the counter to the control computer, is the number N of multiplex channels (where N is usually smaller than 1000), and hence is smaller than the number of pieces of data in the case of using the A/D converter; thus, the data transfer-time is reduced accordingly, permitting high-speed control. Incidentally, the frequency multiplexable band in which the loss of optical fiber is minimized is about 10,000 GHz and a multiplex channels separation of 10 GHz is needed, and hence the number of channels which can be multiplexed is 1000=(10,000 GHz/10 GHz) at most.

Thus, a high-accuracy, high-speed optical frequency multiplexed carrier control system is implemented.

BRIEF DESCRIPTION OF THE DRAWINGS

The present invention will be described in detail below with reference to accompanying drawings, in which.

PREFERRED EMBODIMENTS OF THE INVENTION

Figure 1:
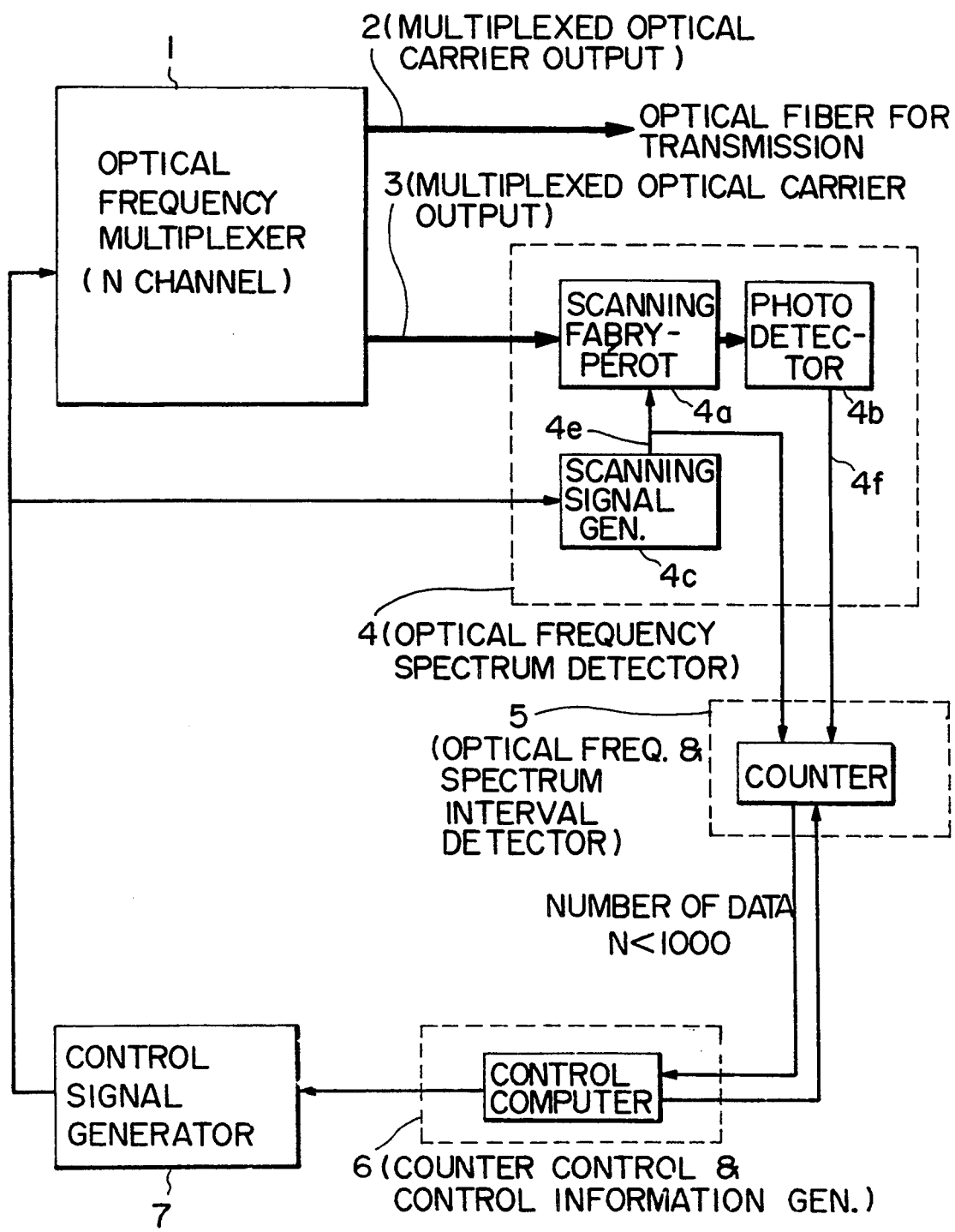
FIG. 1 is a block diagram of the optical frequency multiplex carrier control system according to the present invention.

With reference to FIG. 1 illustrating an embodiment of the present invention, multiplexed optical carrier output 2, which is composed of carriers of optical frequencies $f_l$ to $f_n$ multiplexed by a multiplexer 1 and an optical frequency standard $f_{st}$, is guided into an optical fiber for transmission, and multiplexed optical carrier output 3 is input into an optical frequency spectrum detector 4.

Figure 2:
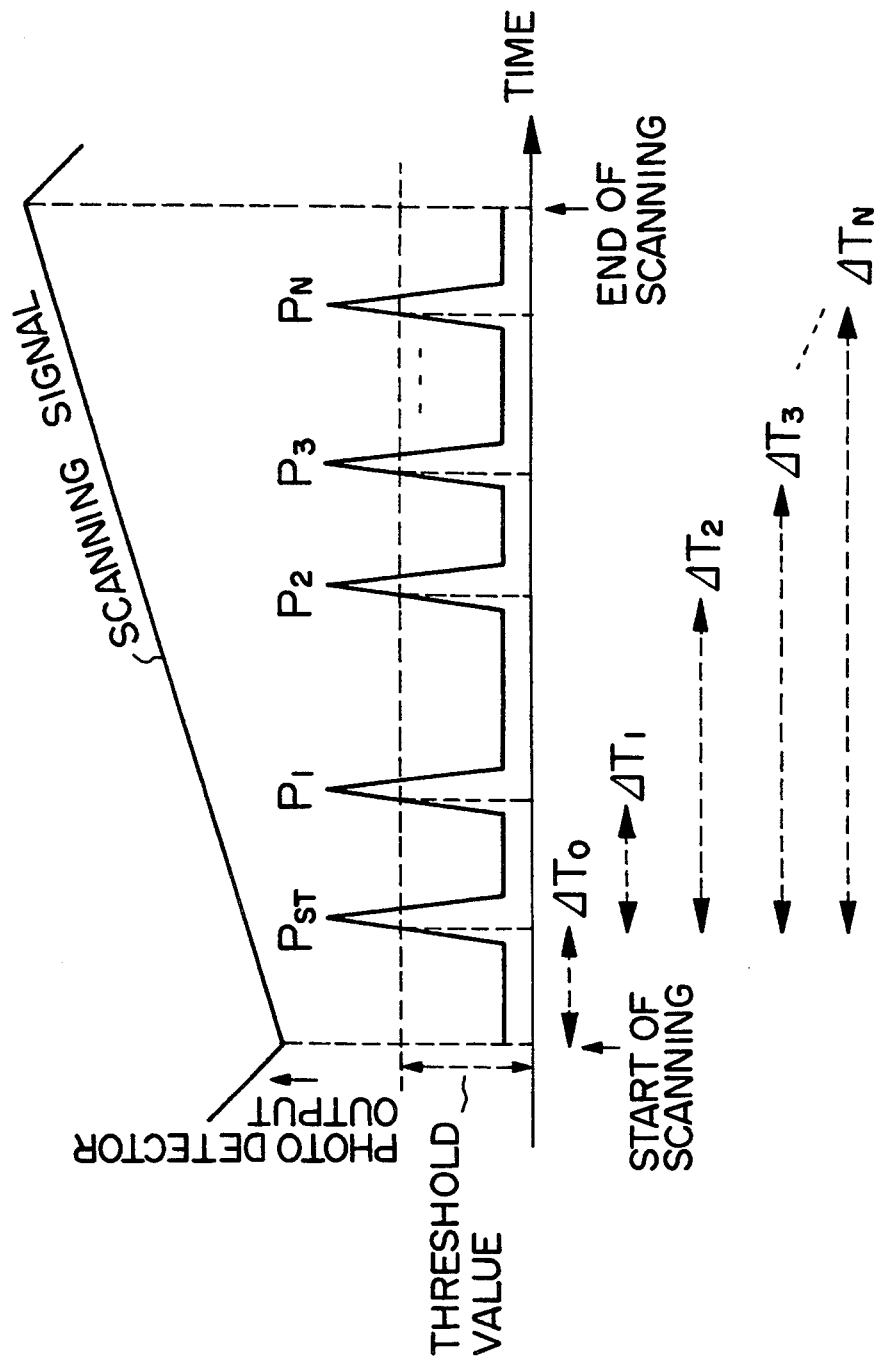
FIG. 2 is a diagram showing a pulse train corresponding to multiplex carrier frequency spectra which are input into the counter according to the present invention.

FIG. 2 shows time waveforms of a scanning signal 4e and a photo-detector output 4f. As the scanning signal 4e increases, the photo-detector output 4f is applied, as electric signal pulses $P_{st}$, $P_1$, $P_2'$ ..., $P_N$ corresponding to the optical frequency standard and the multiplexed carrier spectra, to a frequency spectrum interval detector 5 which is formed by a counter.

The scanning signal 4e (or a rectangular wave synchronized with the sweep signal) is also applied to the counter 5, starting measurement at the same time as the counter 5 starts scanning. When a measurement start instruction is provided to the counter 5 from a counter control and control information generator 6, time $\Delta T_0$ from the start of the scanning operation to the arrival of an optical frequency standard pulse and the time intervals $\Delta T_1$, $\Delta T_2$, $\Delta T_N$ between the optical frequency standard pulse and respective multiplex carrier pulses are measured on the basis of a preset threshold value.

Figure 3:
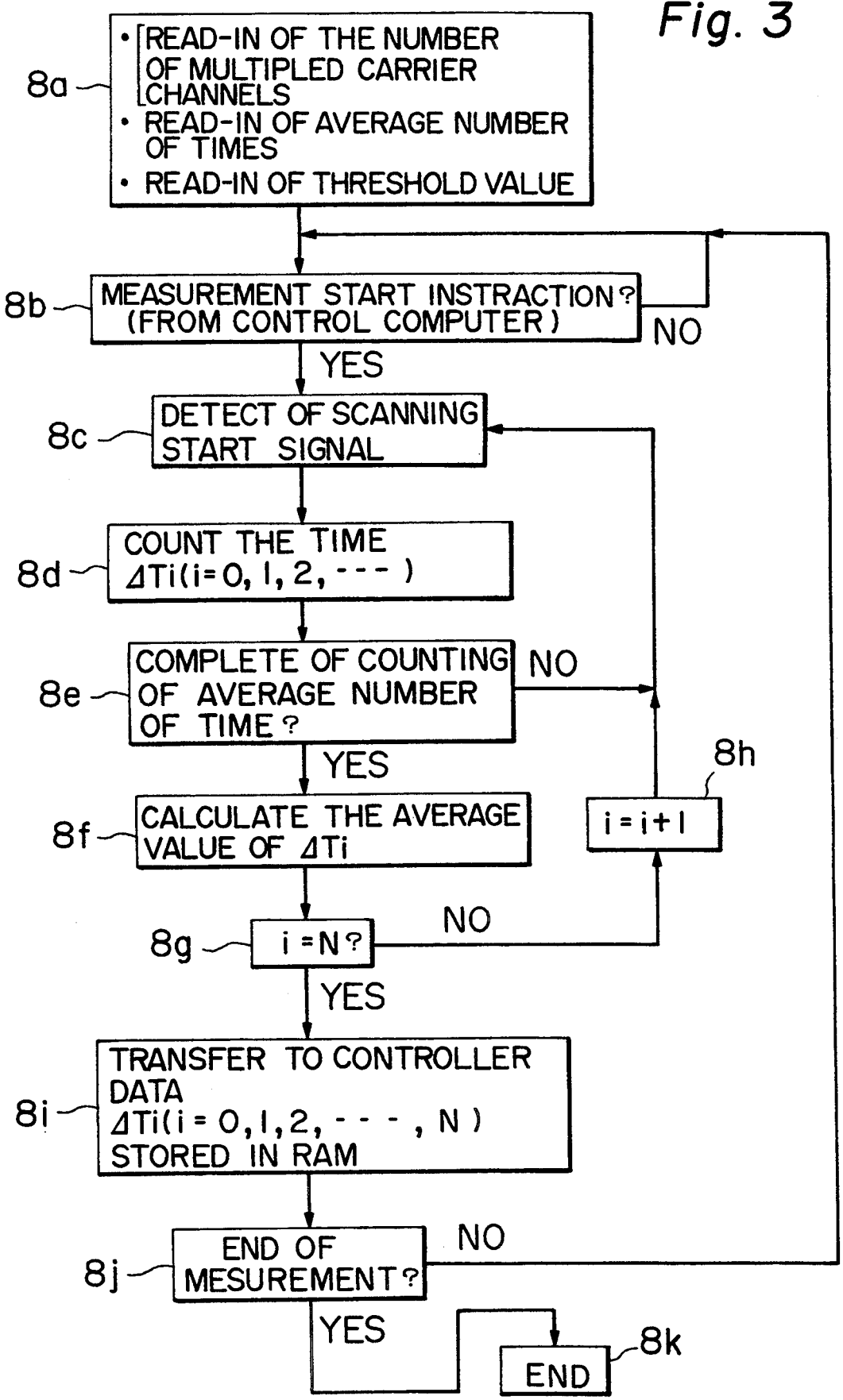
FIG. 3 is a flowchart explanatory of the operation of the counter.
Figure 4:
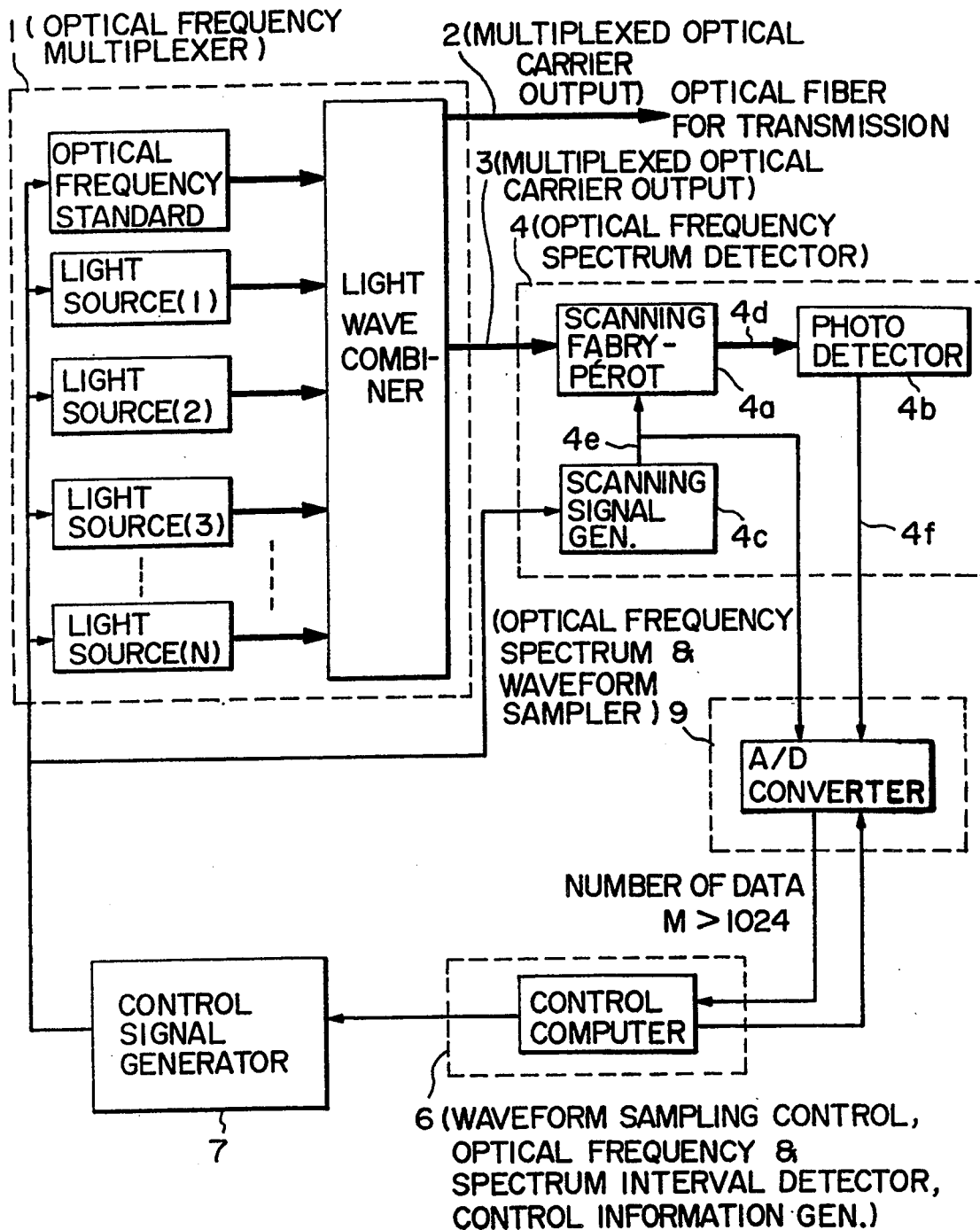
FIG. 4 is a block diagram of a conventional optical frequency multiplex carrier control system.

In FIG. 3 there is shown an example of a flowchart explanatory of operations of the counter 5 in the present invention. In step 8a the number of multiplex carrier channels, an average number of times and a pulse threshold value are inputted in the counter; in step 8b the counter waits for a measurement start instruction from the control computer 6; in step 8c the instruction is issued and the counter starts to scan; and in step 8d the counter counts the time $\Delta T_0$. In step 8e the counter goes back to step 8c to repeat the measurements until the average number of times is reached; in step 8f the average value of the time measured is computed; in steps 8g and 8h the same operations as mentioned above are performed for each of the time intervals $\Delta T_1$, $\Delta T_2$ and $\Delta T_N$ and the measured results are stored in a RAM in the counter 5. Upon completion of all the measurements, the data stored in the RAM is transferred to the control computer 6 in step 8i, after which the counter returns to the waiting state 8b in response to an instruction from the control computer 6, and if an end instruction is issued, the operation of the counter ends in step 8k.

The control computer sends to the control signal generator 7 control information obtained by computing, from the measured results by the counter 5, variations in the optical frequency scanning range of the scanning type Fabry-Pérot means 4a and in each carrier frequency with respect to the optical frequency standard so that the time intervals $\Delta T_0$ through $\Delta T_N$ each become constant. The scanning signal generator 4c is controlled so that the scanning optical frequency spectrum region becomes constant with respect to the optical frequency standard, and the multiplex carrier frequencies $f_l$ to $f_n$ are controlled for stabilization with respect to the optical frequency standard $f_{st}$.

Thus, according to the optical frequency multiplex carrier control system of this embodiment, a change in each multiplex carrier frequency can be detected with high accuracy without being affected by the influence of the resolution of the A/D converter and the number of pieces of data to be transferred to the control computer can be reduced from the number of samples of the spectrum waveform to the number of multiplex channels. Hence, the data transfer time is reduced, permitting high-speed control of the multichannels.

As described above in detail, according to the optical frequency multiplex carrier control system of the present invention, the frequency spacings between the optical frequency standard spectrum and the multiplex carrier spectrum can be accurately measured, by a counter having a highly accurate clock, as the time interval between pulse signals corresponding to the optical frequency standard spectrum and the multiplex carrier spectrum, and the number of pieces of data to be transferred to the control computer can be decreased from the number of samples of the spectrum waveform to the number of multiplex channels. Thus, the present invention produces excellent effects such as implementation of a high-accuracy, high-speed optical frequency multiplex carrier control device.

With the conventional optical frequency multiplex carrier control device employing an A/D converter, the frequency multiplex carrier control accuracy is limited to the optical frequency scanning region x $M_l^{-1}$ (where $M_l$ is the number of pieces of sampling data), besides the time for data transfer to the control computer is appreciably long (several seconds or more) in the case of $M << 1000$. According to the system of the present invention, however, when the scanning signal has a period of 10 ms, the use of a counter with a 1 ns measuring time accuracy would provide a control accuracy of optical frequency scanning region x $10^{-7}$ ($10^{-7} = 1$ ns/10 ms) and the time for data transfer to the control computer would not matter.

What we claim is:

1. An optical frequency multiplex carrier control system comprising:

multiplexing means for multiplexing optical carriers together with an optical frequency standard pulse and outputting a multiplexed optical carrier signal;

scanning type Fabry-Pérot means for analyzing the spectrum of the carrier of the optical carrier signal received from said multiplexing means;

a signal generator for generating a scanning electrical signal for driving said scanning type Fabry-Férot means;

a photodetector for performing photoelectric conversion of a lightwave transmitted through said scanning type Fabry-Pérot means;

a counter for measuring, in sychronization with said scanning electric signal, the time interval between a pulse corresponding to said optical frequency standard and said scanning electric signal in said converted electric signal and the time interval between a pulse corresponding to the spectrum of said optical frequency standard and a pulse corresponding to the spectrum of each carrier in said converted electric signal;

a control computer for transmitting control information obtained by computing, from measured results by said counter, variations in optical frequency scanning range of said scanning type Fabry-Pérot means and in each carrier frequency with respect to said optical frequency standard; and control signal generating means responsive to said control information from said control computer for generating and sending a control signal to said multipexing means to effect stabilization control of the frequency of said optical carrier signal.

* * * * *